United States Patent

Ebert et al.

[11] Patent Number: 5,852,070
[45] Date of Patent: Dec. 22, 1998

[54] (CO) POLYCARBONATES STABILISED AGAINST γ-RADIATION

[75] Inventors: Wolfgang Ebert, Krefeld; Ralf Hufen, Duisburg; Heidemarie Pantke, Ratingen; Klaus Berg, Krefeld, all of Germany

[73] Assignee: Bayer AG, Germany

[21] Appl. No.: 742,292

[22] Filed: Nov. 4, 1996

[30] Foreign Application Priority Data

Nov. 13, 1995 [DE] Germany .................. 195 42 186.8

[51] Int. Cl.⁶ ...................................... C08K 5/41
[52] U.S. Cl. .................. 523/136; 524/167; 524/170; 524/171; 524/306; 524/357
[58] Field of Search .................. 523/136; 524/170, 524/171, 357, 306, 167

[56] References Cited

U.S. PATENT DOCUMENTS

| | | | |
|---|---|---|---|
| 3,186,961 | 6/1965 | Sears ........................................ | 524/306 |
| 3,386,935 | 6/1968 | Jackson et al. ......................... | 524/170 |
| 3,407,140 | 10/1968 | Chiddix et al. ........................ | 524/167 |
| 4,097,435 | 6/1978 | Rawlings et al. ...................... | 524/306 |
| 4,184,994 | 1/1980 | Mark et al. ............................. | 524/357 |
| 4,282,134 | 8/1981 | Mark et al. ............................. | 524/170 |
| 4,290,934 | 9/1981 | Mark et al. ............................. | 524/167 |
| 4,303,759 | 12/1981 | Dixon et al. ........................... | 524/170 |
| 4,403,054 | 9/1983 | Mark . | |
| 4,407,996 | 10/1983 | Cooper et al. ......................... | 524/170 |
| 4,804,692 | 2/1989 | Lundy et al. ........................... | 523/136 |
| 4,873,271 | 10/1989 | Lundy et al. ........................... | 523/136 |
| 4,880,853 | 11/1989 | Nelson et al. .......................... | 523/136 |
| 4,880,855 | 11/1989 | Nelson et al. .......................... | 523/136 |
| 4,996,247 | 2/1991 | Nelson et al. .......................... | 524/170 |
| 5,382,605 | 1/1995 | Powell et al. . | |
| 5,612,398 | 3/1997 | Fennhoff et al. ...................... | 523/136 |

FOREIGN PATENT DOCUMENTS

| | | |
|---|---|---|
| 611 797 | 8/1984 | European Pat. Off. . |
| 114 973 | 3/1985 | European Pat. Off. . |
| 152 012 | 8/1985 | European Pat. Off. . |
| 376 289 | 7/1990 | European Pat. Off. . |

*Primary Examiner*—Veronica P. Hoke
*Attorney, Agent, or Firm*—Connolly & Hutz

[57] ABSTRACT

The present invention provides polycarbonate moulding compositions containing polycarbonates, stabilisers of the general formula (I)

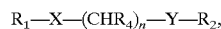

$$R_1-X-(CHR_4)_n-Y-R_2,$$

where X and Y, are either

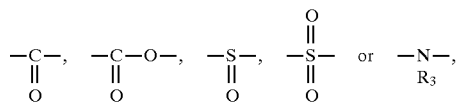

, and Y may also be —S—, and optionally polypropylene glycols.

The present invention also provides use of these moulding compositions for preparing items for medical applications.

12 Claims, No Drawings

(CO) POLYCARBONATES STABILISED AGAINST γ-RADIATION

The invention relates to copolycarbonates based on diphenols and one or more stabilisers, stabilised against the discolouring effect of γ-radiation.

The invention provides polycarbonate moulding compositions containing a) 97.5 wt. % to 99.9 wt. % of a polycarbonate or copolycarbonate and b) 0.1 wt. % to 2.5 wt. % of a γ-radiation stabiliser of the general formula (I), each with reference to 100 wt. % of a)+b),

in which $R_1$, $R_2$ and $R_4$ represent $C_1$–$C_{36}$ optionally branched alkyl groups, preferably $C_1$–$C_{12}$ optionally branched alkyl groups or $C_{16}$–$C_{24}$ optionally branched alkyl groups, $C_7$–$C_{18}$ optionally branched and/or substituted alkylaryl or arylalkyl groups or $C_6$–$C_{18}$, preferably $C_6$, optionally substituted aryl groups and $R_4$ may also represent H, and in which "n" is a number between 1 and 8, preferably 1, and if $R_1$=$R_2$=benzyl and Y is a single bond, may also be zero, and wherein X and Y, independently of each other, are

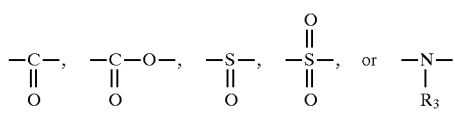

and Y may also represent —S— where $R_3$ is defined in the same way as $R_1$, wherein $R_3$ is preferably methyl, benzyl or phenyl, or in which X or Y is a single chemical bond; groups $R_1$ and $R_2$ which are part of a 4 to 12-membered, preferably 5 or 6-membered, optionally heterocyclic ring system, via groups X and Y respectively, wherein in this case $R_1$ or $R_2$ may be a single bond, are also suitable.

Preferred compounds (I) are those in which X and/or Y represent

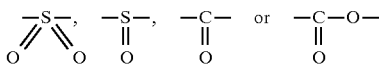

and those in which X or Y represent a single bond and those in which Y=—S—.

Particularly preferred compounds (I) are those in which X is

and

Y is

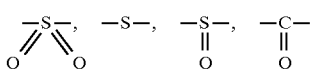

or a single bond.

In a specific embodiment of compounds (I), $R_1$=$R_2$=benzyl, Y is a single bond and n=0.

As a further stabiliser c), 0.05 wt. % to 5 wt. %, preferably 0.1 wt. % to 1.5 wt. %, of optionally terminally capped and/or branched polypropylene glycol with an average molecular weight of 200 to 200,000, preferably 800 to 4,000, may be contained in the polycarbonate moulding compositions according to the invention, wherein the percentages by weight of c) are each with reference to 100 wt. % of a)+b).

The prior art relating to stabilisation against γ-radiation comprises incorporating oligomeric polypropylene glycols (EP 376 289), oligomeric, brominated bisphenol A polycarbonates (EP 114 973), blends of polycarbonate and polyesters based on terephthalic acid and cyclohexanedimethanol (EP 152 012), organic disulphides (U.S. Pat. No. 5,382,605 (Mo 3788)) or organic monosulphides (EP-611 797 (Mo 3913+Mo 3960)), each optionally combined with oligomeric polypropylene glycols, into the polycarbonate.

The disadvantages associated with these stabilisers are, for instance, as follows: polypropylene glycol on its own provides inadequate stabilisation at high radiation doses, brominated systems are preferably not used because of the presence of a halogen, the use of polyester blends means that superheated steam sterilisation cannot be applied and in the case of a disulphide system there is a small processing window prior to decomposition.

When using a monosulphide system in accordance with EP-0 611 797, on the other hand, as is also the case with a disulphide system, nuisance effects due to unpleasant odours cannot be excluded.

There was therefore the object of developing an additive system which is stable under manufacturing and processing conditions, which produces superheated steam sterilisable moulded articles, in order to ensure universal applicability, does not utilise halogen-containing stabilisers and ensures adequate stabilisation when irradiated at 5 Mrad.

The object was achieved by the use according to the invention of stabiliser (I).

Suitable diphenols for the preparation of polycarbonates to be used according to the invention are those of the general formula (II)

with preferably 6 to 30 carbon atoms, either mononuclear or polynuclear diphenols, which may contain hetero-atoms and have substituents which are inert under the conditions of polycarbonate preparation and when exposed to thermal irradiation.

Examples of these are hydroquinone, resorcinol, dihydroxydiphenyl, bis-(hydroxyphenyl)-alkanes, bis-(hydroxyphenyl)-cycloalkanes, bis-(hydroxyphenyl) sulphides, ethers, sulphoxides, sulphones and α,α-bis-(hydroxyphenyl)-diisopropylbenzenes as well as their ring-alkylated and ring-halogenated compounds.

Suitable phenols are described, for example, in U.S. Pat. Nos. 3,028,365, 2,999,835, 3,062,781, 3,148,172 and 4,982,014, in DE-OS 1 570 703 and 2 063 050, and also in the monograph "H. Schnell, Chemistry and Physics of Polycarbonates, Interscience Publishers, New York, 1964".

Preferred diphenols are 4,4'-dihydroxydiphenol, 2,2-bis-(4-hydroxyphenyl)-propane, 2,4-bis-(4-hydroxyphenyl)-2-methylbutane, 1-bis-(4-hydroxyphenyl)-cyclohexane, α,α-bis-(4-hydroxyphenyl)-p-diisopropylbenzene, α,α-bis-(4-hydroxyphenyl)-m-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropylbenzene, 1,1-bis-(4- hydroxyphenyl)- 3,3,5-trimethylcyclohexane, 1,1-bis-(4-hydroxyphenyl)-3-methylcyclohexane, 1,1-bis-(4-hydroxyphenyl)-3,3-dimethylcyclohexane, 1,1-bis-(4-hydroxyphenyl)-4-methylcyclohexane, 2,2bis-(3,5-dichloro-4-hydroxyphenyl)-propane, 2,2-bis-(3,5-dibromo-4-hydroxyphenyl)-propane, 1,1-bis-(4-hydroxyphenyl)-1-phenylethane, 2,2-bis-(3,5-dimethyl-4-hydroxyphenyl)-2-phenylethane, 2,2-bis-(4-hydroxyphenyl)-2,2-diphenylethane, 9,9-bis-(4-hydroxyphenyl)-fluorene, 9,9-bis-(3,5-dimethyl-4-hydroxyphenyl)-fluorene.

Particularly preferred diphenols are, for instance, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(4-hydroxyphenyl)-1-phenylethane, 1,1 -bis-(4-hydroxyphenyl)-3,3,5-trimethylcyclohexane, 1,1-bis-(4-hydroxyphenyl)-3-methylcyclohexane, 1,1-bis-(4-hydroxyphenyl)-4-methylcyclohexane, 9,9-bis-(3,5-dimethyl-4-hydroxyphenyl)-fluorene.

In particular, 2,2-bis-(4-hydroxyphenyl)-propane, 1,1-bis-(4-hydroxyphenyl)-3,3,5-trimethylcyclohexane and 1,1-bis-(4-hydroxyphenyl)-1-phenylethane are preferred.

Any mixture of the previously mentioned diphenols may also be used.

With the objective of improving the flow behaviour, small amounts, preferably amounts between 0.05 and 2.0 mol-% (with reference to the moles of diphenols used), of trifunctional or more than trifunctional compounds, in particular those with three or more than three phenolic hydroxyl groups, may also be incorporated in a known manner during synthesis. Some of the compounds which may be used are, for instance, 1,3,5-tris-(4-hydroxyphenyl)-benzene, 1,3,5-tris-(4-(4-hydroxyphenyl-isopropyl)-phenyl)-benzene, 1,1,1-tris-(4-hydroxyphenyl)-ethane, 2,6-bis-(2-hydroxy-5'-methylbenzyl)-4-methylbenzene2-(4-hydroxyphenyl)-2-(2,4-dihydroxyphenyl)-propane, esters of hexakis-(4-(4-hydroxyphenylisopropyl)-phenyl)-o-terephthalic acid, tetrakis-(4-hydroxyphenyl)-methane, 1,1-bis((4',4"-dihydroxytriphenyl)-methyl)-benzene, 3,3,-bis-(4-hydroxyphenyl)-2-oxo-2,3-dihydroindole, 3,3-bis-(4-hydroxy-3-methylphenyl)-2-oxo-2,3-dihydroindole, also suitable are the esters of the chlorocarbonic acids corresponding to these compounds and the acids, or preferably the acid chlorides, of more than 2-basic aliphatic or aromatic carboxylic acids, that is, for example, 2,4-dihydroxybenzoic acid or 2,4-dihydroxybenzoic dichloride, trimesic acid or trimesic trichloride, trimellitic acid or trimellitic trichloride, cyanuric trichloride, wherein these branching agents are initially introduced individually or as a mixture or may be added in portions during synthesis.

Chain terminators which may be used in the synthesis include phenols, optionally substituted phenols, their chlorocarbonic acids, monocarboxylic acids, and their acid chlorides, preferably cumylphenol, phenol, tert.-butylphenol and i-octylphenol, optionally as mixtures, with conventional impurities and isomers, wherein the chain terminators may be initially introduced individually or as a mixture with the diphenols or may be added in portions during synthesis.

The polycarbonates or polycarbonate mixtures to be used according to the invention may essentially be prepared by the following three known methods (see H. Schnell, "Chemistry and Physics of Polycarbonates", Polymer Review, vol. IX, pages 27 et seq., Interscience Publishers, New York, 1964):

1. By a solution process in dispersed phase, the so-called "two-phase interfacial process".
2. By a solution process in homogeneous phase, also known as the "pyridine process".
3. By the melt transesterification process.

Polycarbonates to be used according to the invention have average weight molecular weights $\overline{M}_w$ (determined by measuring the relative viscosity in $CH_2Cl_2$ at 25° C. and at a concentration of 0.5 g in 100 ml of $CH_2Cl_2$) between 10,000 and 80,000, preferably between 15,000 and 40,000.

Conventional additives for thermoplastic polycarbonates such as stabilisers, that is e.g. thermal stabilisers such as, for example, organic phosphites, optionally in combination with monomeric or oligomeric epoxides, UV stabilisers, in particular those based on nitrogen-containing heterocyclic compounds such as triazoles, optical brighteners, flame retardants, in particular fluorine-containing compounds such as perfluorinated salts of organic acids, polyperfluoroethylene, salts of organic sulphonic acids and combinations of these, optionally other mould release agents, colorants, pigments, antistatic agents, fillers and reinforcing substances may be added in conventional amounts to, the polycarbonate moulding compositions according to the invention, before, during or after processing.

Preferred γ-stabilisers of the formula (I) are in particular those of the formula (Ia)

$$R_1-\underset{O}{\overset{O}{\underset{\|}{S}}}-(CHR_4)_nY-R_2 \qquad (Ia)$$

where $R_1$ and $R_2$, independently of each other, represent methyl, ethyl, i/n-propyl, i/n/t-butyl, i/n-pentyl, ethylhexyl, cyclopentyl, cyclohexyl, stearyl, palmityl, benzyl, phenyl, cresyl and myristyl, $R_4$ represents H, $CH_3$, benzyl and phenyl, Y represents —$SO_2$—, —S—, —SO—, —CO— or a single bond and n=1 or 2.

Particularly preferred are those compounds of the type (Ia) in which $R_1$ and $R_2$, independently of each other, represent methyl, phenyl or benzyl, $R_4$=H or $CH_3$, Y represents —$SO_2$— or —CO— and n=1.

Dibenzylsulphone is also particularly preferred, that is (Ia) where $R_1$=$R_2$=benzyl, Y=a single bond and n=zero.

Stabilisers (I) and (Ia) are either known and described in the relevant works of reference such as Beilstein or Chemical Abstracts or can be synthesised by known methods of synthesis for, for example, 1,3-dicarbonyl compounds or sulphonic acids or sulphone compounds.

The following references are given by way of example:

Römpp: "Lexikon der Chemie", 9th ed., vol. 5, page 4384;

Houben-Weyl: 9, pages 223 et seq., E11, pages 1132–1299;

Kharash: "Organic Sulphur Compounds", vol. 1, pages 617 et seq.;

Patai: "The Chemistry of Sulphones and Sulphoxides", pages 165 et seq., 232 et seq., 1988 J. Wiley & Sons;

Winnacker-Küchler: (3rd) 4, pages 166 et seq.;

Beilstein vols. 6, I 6, II 6, in particular pages 305, 426, 456, 868, I 226, I 408, II 430, II 829 and II 854.

Examples of stabilisers (I) are:

a) 1,3-dicarbonyl compounds such as, for example, dimethyl, diethyl, di-i/n-propyl, di-i/n/t-butyl, di-i/n-pentyl, dicyclopentyl, dicyclohexyl, distearyl, dimyristyl, dipalmityl, dibenzyl, diphenyl esters of malonic acid and Meldrum's acid and its higher homologues based on other ketones.

b) Methyl, ethyl, i/n-propyl, i/n/t-butyl, i/n-pentyl, ethylhexyl, cyclopentyl, cyclohexyl, stearyl, myristyl, palmityl, benzyl, phenyl esters or cresyl esters of optionally substituted acetic acid.

c) Esters of the carboxylic acids mentioned under a), wherein one or both carboxyl groups are replaced by sulphonic acid groups.

d) Sulphonic acid analogues of the acetates mentioned under b).

e) The compounds mentioned under b) and d) after exchanging the carbonyl groups for $SO_2$ groups.

f) 1,3-diketones, such as e.g. 1,3-pentanedione.

The stabilisers mentioned are used, individually or in any mixture, at concentrations of 0.1 wt. % to 2.5 wt. %, wherein they may be added in bulk, as a powder or a melt, or else as a solution before or during processing of the polycarbonate resin, or also in a subsequent compounding step. Dichloromethane and/or chlorobenzene, for example, may be used as a solvent for (I).

It may be advantageous, if the moulding compositions also contain, in addition to the stabilisers mentioned, polypropylene glycols in amounts of 0.05 wt. % to 5 wt. %, preferably 0.1 wt. % to 1.5 wt. % of optionally terminally capped and/or branched polypropylene glycol with an average molecular weight of 200 to 200,000, preferably 800 to 4,000. This type of polypropylene glycol is known from the literature. In order to eliminate slight yellow coloration, which does occasionally occur, it may be beneficial under some circumstances to also provide the moulding compositions with the phosphorus-containing stabilisers which are conventionally used for polycarbonates.

Polycarbonates according to the invention may be processed to give moulded articles by, for example, extruding the isolated polycarbonates to give a granular material in a known manner and processing this granular material, optionally after the addition of the additives mentioned above, by injection moulding in a known manner to produce a variety of articles.

Polycarbonates according to the invention can be used as moulded articles in particular wherever it is known that polycarbonates have hitherto been used for this purpose, especially however in medical fields of application, that is, for example, for dialyser housings.

The invention therefore also provides use of the polycarbonate moulding compositions according to the invention for preparing items for medical applications.

Polycarbonates according to the invention may be admixed with other thermoplastic materials in conventional amounts, i.e. between 10 wt. % and 50 wt. %, with reference to the polycarbonate according to the invention, mostly for non-transparent applications.

Appropriate other thermoplastic materials are, for example, aromatic polyestercarbonates, polycarbonates based on different bisphenols from the polycarbonates according to the invention, polyalkylene terephthalates, EPDM polymers, polystyrene and copolymers and graft copolymers based on styrene such as in particular ABS.

EXAMPLES

To prepare test specimens, an additive-free, unstabilised polycarbonate with an average molecular weight of about 30,000 (Mw by GPC), solution viscosity: $\eta$=1.293, was compounded at 300° C. on a twin screw extruder with the stated amount of stabiliser and then granulated. Colour test platelets (thickness 4 mm) were then made from this granular material by injection moulding. The yellowness index of these platelets is determined before irradiation (Hunter Lab. equipment), then the specimens are irradiated (dose: 5 Mrad; Co bomb), stored for 10 days in the dark and the YI determined again. $YI_{diff}$, used for assessment, is determined from the difference between the two measurements, before and after irradiation.

a) Comparison test:

| Compound | Conc. (wt. %) | $YI_{initial}$ | $YI_{irrad}$ | $YI_{diff}$ |
|---|---|---|---|---|
| Polycarbonate$_{reextr}$ | — | 6.31 | 48.88 | 42.57 |
|  | — | 6.27 | 48.07 | 41.80 |
| Polypropylene glycol | 0.75 | 4.58 | 29.24 | 24.66 |
|  | 0.75 | 4.70 | 30.07 | 25.37 |
| Distearyl sulphide | 0.50 | 10.47 | 25.93 | 15.46 |
|  | 0.50 | 10.16 | 25.70 | 15.54 | b) According to the invention (Irradiation dose: 5 Mrad)

| Compound | Conc. (wt. %) | $YI_{initial}$ | $YI_{irrad}$ | $YI_{diff}$ |
|---|---|---|---|---|
| Example 1: | | | | |
| Compound A | 0.5 | 3.6 | 9.9 | 6.3 |
| Compound B | 0.5 | 5.3 | 13.1 | 7.8 |
| Compound C | 0.5 | 7.6 | 19.5 | 11.9 |
| Compound D | 0.5 | 6.5 | 12.0 | 5.5 |

All the examples also contained 0.75 wt. % of polypropylene glycol M.Wt. about 2000.

Compound A: phenyl—$SO_2$—$CH_2$—$SO_2$—phenyl
Compound B: phenyl—CO—$CH_2$—$SO_2$—phenyl
Compound C: dibenzylsulphone
Compound D:

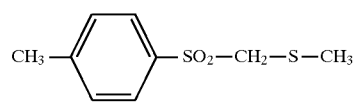

According to the invention (Irradiation dose: 3 Mrad)

| Compound | Conc. (wt. %) | $YI_{initial}$ | $YI_{irrad}$ | $YI_{diff}$ |
|---|---|---|---|---|
| Example 2: | | | | |
| Compound B | 0.5 | 5.3 | 11.4 | 6.1 |
| Compound D | 0.5 | 6.5 | 10.3 | 3.8 |

All the examples also contained 0.75 wt. % of polypropylene glycol M.Wt. about 2000.

Compound B: phenyl—CO—$CH_2$—$SO_2$—phenyl
Compound D:

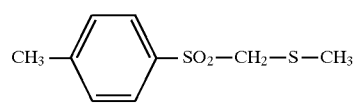

We claim:

1. A polycarbonate moulding composition comprising:

a) 97.5 wt. % to 99.9 wt. % of a polycarbonate;

b) a γ-radiation stabiliser composition comprising 0.1 wt. % to 2.5 wt. % of a stabiliser having the formula (I):

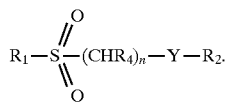

(I)

$R_1$ and $R_2$, independently of each other, represent a methyl group, a $C_7$–$C_{18}$ optionally branched and/or substituted alkylaryl group or a $C_6$ aryl group $R_4$ represents a methyl group, a $C_2$–$C_{18}$ optionally branched and/or substituted alkylaryl group, a $C_6$ aryl group or H, n is a number between 1 and 8, and Y represents

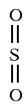

or —S—; and c) 0.05 wt. % to 5 wt. % of an optionally terminally capped and/or branched polypropylene glycol having an average molecular weight of 200 to 200,00, wherein the percentages by weight of each component are with reference to 100 wt. % of a)+b).

2. The moulding composition according to claim 1, wherein the polycarbonate is prepared from 2,2-bis-(4-hydroxyphenyl)propane, 1,1-bis-(4-hydroxyphenyl)-3,3,5-trimethylcyclohexane, 1,1-bis (4-hydroxyphepyl)-1-phenylethane, or a mixture thereof.

3. The polycarbonate moulding composition according to claim 1, wherein the polypropylene glycol of step c) has an average molecular weight of 800 to 4,000.

4. The polycarbonate moulding composition according to claim 2, wherein the polypropylene glycol of step c) is present in an amount of 0.1 wt. to 1.54 wt. %, the percentages by weight of the polypropylene glycol each being with reference to 100 wt. % of a)+b).

5. The polycarbonate moulding composition according to claim 1, further comprising a phosphorous containing stabiliser.

6. The polycarbonate moulding composition according to claim 1, further comprising a thermoplastic material.

7. The polycarbonate moulding composition according to claim 6, wherein the thermoplastic material is present in an amount of 10 wt. % to 50 wt. %, the percentages by weight of the thermoplastic material each being with reference to 100 wt. % of a)+b).

8. The polycarbonate moulding composition according to claim 6, wherein the thermoplastic material comprises aromatic polyester carbonates, polyalkylene terephthalates, EPDM polymers, polystyrene, copolymers based on styrene, and polycarbonates based on different bisphenols from the polycarbonates according to claim 6.

9. The polycarbonate moulding composition according to claim 1, further comprising additives.

10. The polycarbonate moulding composition according to claim 9, wherein the additives comprise thermal stabilisers, UV stabilisers, optical brighteners, flame retardants, mould release agents, colorants, pigments, antistatic agents, fillers, reinforcing substances, or a mixture thereof.

11. The polycarbonate moulding composition according to claim 1, wherein the γ-radiation stabiliser corresponds to the formula (Ia)

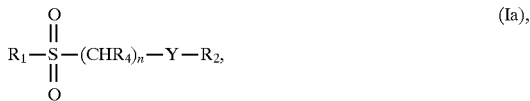

wherein $R_1$ and $R_2$, independently of each other, represent methyl, phenyl, or cresyl, $R_4$ represents H, $CH_3$, or phenyl, Y represents —$SO_2$ or —S—, and n=1 or 2.

12. A polycarbonate moulding composition consisting essentially of:

a) 97.5 wt. % to 99.9 wt. % of a polycarbonate;

b) a γ-radiation stabiliser composition comprising 0.1 wt. % to 2.5 wt. % of a stabiliser having the formula (I):

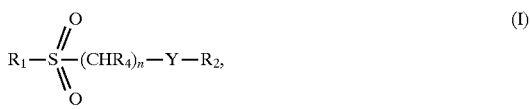

where $R_1$ and $R_2$, independently of each other, represent a methyl group, a $C_7$–$C_{18}$ optionally branched and/or substituted alkylaryl group or a $C_6$ aryl group, $R_4$ represents a methyl group, a $C_7$–$C_{18}$ optionally branched and/or substituted alkylaryl group, a $C_6$ aryl group or H, n is a number between 1 and 8, and Y represents

or —S—; and c) 0.05 wt. to 5 wt. % of an optionally terminally capped and/or branched polypropylene glycol having an average molecular weight of 200 to 200,000, wherein the percentages by weight of each component are with reference to 100 wt. % of a)+b).

* * * * *

UNITED STATES PATENT AND TRADEMARK OFFICE
CERTIFICATE OF CORRECTION

PATENT NO. : 5,852,070
DATED : December 22, 1998
INVENTOR(S) : Wolfgang Ebert et al.

It is certified that error appears in the above-identified patent and that said Letters Patent is hereby corrected as shown below:

Claim 1, section b (col. 7, line 8), after "aryl group" add -- , --;

Claim 1, section b (col. 7, line 8), "$R_4$" starts on a new line;

Claim 1, section b (col. 7, line 9), change "$C_2$" to -- $C_7$ --;

Claim 1, section c (col. 7, line 23), change "200,00" to -- 200,000 --;

Claim 2, line 4 (col. 7, line 29), change "4-hydroxyphepyl" to -- 4-hydroxyphenyl --;

Claim 4, line 3 (col. 7, line 36), change "1.54 wt.%" to -- 1.5 wt.% --; and

Claim 12, line 10 (col. 8, line 36), "$R_4$" starts on a new line.

Signed and Sealed this

Twenty-seventh Day of July, 1999

*Attest:*

Q. TODD DICKINSON

*Attesting Officer*  *Acting Commissioner of Patents and Trademarks*